United States Patent
Cha et al.

(10) Patent No.: US 11,074,406 B2
(45) Date of Patent: Jul. 27, 2021

(54) DEVICE FOR AUTOMATICALLY DETECTING MORPHEME PART OF SPEECH TAGGING CORPUS ERROR BY USING ROUGH SETS, AND METHOD THEREFOR

(71) Applicant: CHANGWON NATIONAL UNIVERSITY INDUSTRY UNIVERSITY COOPERATION FOUNDATION, Changwon-si (KR)

(72) Inventors: Jeong Won Cha, Changwon-si (KR); Tae Ho Park, Daejeon (KR); Chang Uk Shin, Gimhae-si (KR); Da Sol Park, Gimhae-si (KR); Seong Jae Park, Changwon-si (KR)

(73) Assignee: CHANGWON NATIONAL UNIVERSITY INDUSTRY UNIVERSITY COOPERATION FOUNDATION, Gyeongsangnam-Do (KR)

( * ) Notice: Subject to any disclaimer, the term of this patent is extended or adjusted under 35 U.S.C. 154(b) by 168 days.

(21) Appl. No.: 16/345,959

(22) PCT Filed: Jun. 29, 2017

(86) PCT No.: PCT/KR2017/006916
§ 371 (c)(1),
(2) Date: Apr. 29, 2019

(87) PCT Pub. No.: WO2018/088664
PCT Pub. Date: May 17, 2018

(65) Prior Publication Data
US 2020/0065369 A1 Feb. 27, 2020

(30) Foreign Application Priority Data
Nov. 10, 2016 (KR) .......................... 10-2016-0149597

(51) Int. Cl.
*G06F 40/20* (2020.01)
*G06F 40/253* (2020.01)

(52) U.S. Cl.
CPC ............ *G06F 40/20* (2020.01); *G06F 40/253* (2020.01)

(58) Field of Classification Search
None
See application file for complete search history.

(56) References Cited

FOREIGN PATENT DOCUMENTS

JP 2002091961 A 3/2002
KR 20050039379 A 4/2005
(Continued)

OTHER PUBLICATIONS

Park et al., "Annotated Corpus Error Detection Using Rough Set", 2016 Korea Computer Congress 2000 (KCC 2016, Jun. 30, 2016), pp. 720-722. (Year: 2016).*

(Continued)

*Primary Examiner* — Anne L Thomas-Homescu
(74) *Attorney, Agent, or Firm* — Harness, Dickey & Pierce, P.L.C.

(57) ABSTRACT

A device for detecting a morpheme tagging corpus error, of the present invention, includes: an attribute generating unit for generating attributes for word phrases included in an input corpus, by using a kernel to which a rough set theory is applied; and an attribute statistics processing unit for generating part-of-speech tagging corpus error data through the calculation of attributes and frequency count for the same word phrases by counting attributes for the same word phrase among the word phrases, and thus the present invention can detect, quantify, and modify errors included in a corpus (learning data) required in learning for classifier generation and recognition for natural language processing.

10 Claims, 7 Drawing Sheets

(56) References Cited

FOREIGN PATENT DOCUMENTS

| | | |
|---|---|---|
| KR | 20120045906 A | 5/2012 |
| KR | 101358614 B1 | 2/2014 |
| KR | 101431339 B1 | 8/2014 |
| KR | 101491581 B1 | 2/2015 |
| KR | 101500617 B1 | 3/2015 |

OTHER PUBLICATIONS

Komorowski et al., "Rough Sets: A Tutorial". (Year: 1999).*
Pawlak, "Rough Sets", International Journal of Computer and Information Science, vol. 11, No. 5. (Year: 1982).*
Li et al., "Phylogenetic analysis of DNA sequences based on k-word and rough set theory", Physica A 398 (2014) 162-171. (Year: 2014).*
Zhang et al., "Rough set based approach to text classification", 2013 IEEE/WIC/ACM International Conferences on Web Intelligence (WI) and Intelligent Agent Technology (IAT). (Year: 2013).*
Chung, Young-June et al.: "Structure Optimization of Neural Networks Using Rough Set Theory", Proceedings of Korean Institute of Intelligent Systems(KIIS) Spring Conference, vol. 8, No. 1, Jun. 1998 (Jun. 1, 1998), pp. 49-52.
Park, Tae-Ho et al.: "Annotated Corpus Error Detection Using Rough Set", 2016 Korea Computer Congress 2000 (KCC 2016, Jun. 30, 2016 (Jun. 30, 2016), pp. 720-722.
International Search Report PCT/ISA/210 for International Application No. PCT/KR2017/006916 dated Sep. 29, 2017.

* cited by examiner

FIGURE 2

Morpheme of previous word phrase
Part-of-speech (POS tag) of previous phrase
Morpheme of current word phrase
Morpheme of next word phrase
Part-of-speech of next word phrase

FIGURE 5

```
...
it is    it/NP+is/JX
apple is  apple/NNG+is/JKS
is not   not/VNC+is/EF
...
```

FIGURE 6

```
...
it is   it/NP
is   is/JX
apple   apple/NNG
is   is/JKS
is not   not/VNC
is   is/EF
...
```

FIGURE 7

```
...
it   it/NP X X it is JX
is   is/JX that NP is apple NNG
apple  apple/NNG is JX apple is JKS
is   is/JKS apple NNG is not VCN
is not  not/VCN is JKS not is EF
is   is/EF not VCN is X X
...
```

DEVICE FOR AUTOMATICALLY DETECTING MORPHEME PART OF SPEECH TAGGING CORPUS ERROR BY USING ROUGH SETS, AND METHOD THEREFOR

CROSS-REFERENCE TO RELATED APPLICATIONS

This application is a national phase under 35 U.S.C. § 371 of PCT International Application No. PCT/KR2017/006916 which has an International filing date of Jun. 29, 2017, which claims priority to Korean Application No. 10-2016-0149597, filed Nov. 10, 2016, the entire contents of each of which are hereby incorporated by reference.

TECHNICAL FIELD

The present invention relates generally to detection of a morpheme part-of-speech error of a corpus for natural language processing and, more particularly, to a device for detecting a morpheme part-of-speech tagging corpus error by using rough sets, and a method therefor, by automatically detecting, quantifying, and modifying errors included in a corpus (learning data) required in learning for classifier generation and recognition for natural language processing.

BACKGROUND ART

Recently, computers and mobile devices have been widely distributed to each and almost every individual. Also, as problem-solving by using machine learning has extended gradually to more and more fields, various research associated with methods for analyzing and correcting any contextual or synthetic error in an input corpus has been actively conducted.

Examples of conventional arts relating to methods for analyzing and correcting contextual or syntactic errors in an input corpus will be described below. Korean Patent No. 10-1500617 discloses a method and a system for context-sensitive spelling correction using a Korean lexico-semantic network, so as to improve the performance of Korean document correctors, by detecting context-sensitive spelling errors that cannot be solved through dictionary searches among several spelling and/or grammatical errors found in Korean sentences input by a user, and correcting the context-sensitive spelling errors of the highest level in the Korean document correction process by suggesting alternative words to correct the context-sensitive spelling errors.

Also, Korean Patent No. 10-1491581 discloses a spelling correction system and a method thereof, to minimize the used volume of a memory and search time by constructing a spelling error correction dictionary in a try (TRIE) type, being capable of automatically recognizing and correcting misspelled inputs through a portable terminal, and, if a registered character string appears, efficiently determining whether to replace the concerned character string with a correct character string, thereby resulting in acquiring a stronger spelling correction effect only by using small volume memory and a simple computation.

Further, Korean Patent No. 10-1431339 discloses a method and an apparatus for probabilistic phrase error detection, including the steps of: obtaining an appearance probability at which each word of the phrase appears within a corpus; obtaining an estimated probability (Pe) at which the phrase may appear within the corpus, a predicted appearance frequency probability (Po), and an actual appearance probability (Pa) of the phrase; and determining whether the phrase has an error, based on the predicted appearance frequency probability and the actual appearance probability, thereby being capable of exactly detecting errors even in special expressions whose frequency is low or in expressions in which repetitive errors are frequently made.

Also, Korean Patent No. 10-1358614 discloses a corpus-based Korean morpheme analysis device and an analysis method thereof, to easily establish a PWD (Partial Word-phrase Dictionary), increase the speed and realization ratio of a morphological analysis, and enhance the accuracy of tagging by compiling a pre-analyzed partial word-phrase dictionary, wherein a learning data establisher to analyze a corpus in order to establish a PWD and determine the adequacy of each morpheme's location, and a morphological analyzer to divide the total word phrases into two or more corpora with respect to the dictionary established by the learning data establisher and then search and analyze them, are included.

However, the conventional arts as described above provide only arts to perform detection and correction of contextual or syntactic errors in national language processing, and they fail to disclose any method for detecting an error in the corpus as learning data, which forms a basis of the natural language processing.

Also, although there were successful research results in unsupervised learning or semi-supervised learning to replace conventional supervised learning, importance of the information tagging corpus for learning has not decreased as those fields to process and utilize the information tagging corpus have gradually increased.

Despite increased importance of the corpus as described above, it has become very difficult to produce consistent corpora because mass corpora are produced manually by a number of persons. Accordingly, as detection and correction of errors in the produced corpora are also caused to be manually conducted, this is problematic in terms of greatly increasing time and costs.

In this regard, an art to detect and quantify the errors included in the corpus for natural language processing is required.

DISCLOSURE

Technical Problem

Accordingly, the present invention has been made keeping in mind the above problems occurring in the related art, and an objective of the present invention is to provide a morpheme part-of-speech tagging corpus error detecting apparatus using rough sets and a method thereof, wherein an error of a corpus produced manually for natural language processing is automatically detected, quantified and corrected, thereby being capable of ensuring error-free mass corpus produced a number of persons, for recognition and generation of a classifier model in the natural language processing.

Technical Solution

In order to accomplish the above-described objective, an exemplary embodiment of the present invention provides a device for detecting a morpheme part-of-speech tagging corpus error by using rough sets, the device including an attribute generating unit 120 for generating attributes for word phrases included in an input corpus, by using a kernel to which a rough set theory is applied, and an attribute statistics processing unit 130 for generating part-of-speech tagging corpus error data through the calculation of attributes and frequency count for the same word phrases by counting attributes for the same word phrase among the word phrases.

For a word phrase to be analyzed in the input corpus, the kernel may be configured to generate attributes in order of a morpheme of a previous word phrase of the word phrase to be analyzed, a part-of-speech of the previous word phrase, a morpheme of the current word phrase, a morpheme of a next word phrase, and a part-of-speech of the next word phrase.

The device for detecting a morpheme part-of-speech tagging corpus error may further include a corpus correcting unit 140 for correcting an attribute generated with the highest frequency count for the same word phrase, using statistical data of the attributes by each word phrase generated in the attribute statistics processing unit 130.

The device for detecting a morpheme part-of-speech tagging corpus error may further include a corpus analyzing unit 110 for transforming the corpus input as learning data in which part-of-speech tagging is performed into data for analysis.

The corpus analyzing unit 110 may be configured to form a morpheme among word phrases included in the input corpus and a morpheme input value by manual work in a single word phrase line sequentially and output them.

In order to accomplish the above-described objective, another exemplary embodiment of the present invention provides a method for detecting a morpheme part-of-speech tagging corpus error by a device for detecting a morpheme part-of-speech tagging corpus error including a corpus analyzing unit 110, an attribute generating unit 120, an attribute statistics processing unit 130 and a corpus correcting unit 140, the method including generating, by the attribute generating unit 120, attributes for word phrases included in an input corpus, by using a kernel to which a rough set theory is applied (S120), and generating, by the attribute statistics processing unit 130, part-of-speech tagging corpus error data through the calculation of attributes and frequency count for the same word phrases by counting attributes for the same word phrase among the word phrases (S130).

For a word phrase to be analyzed in the input corpus, the kernel may be configured to generate attributes in order of a morpheme of a previous word phrase of the word phrase to be analyzed, a part-of-speech of the previous word phrase, a morpheme of the current word phrase, a morpheme of a next word phrase, and a part-of-speech of the next word phrase.

The morpheme part-of-speech tagging corpus error detecting method may further include correcting, by the corpus correcting unit 140, an attribute generated with the highest frequency count for the same word phrase, using statistical data of the attributes by each word phrase generated in the attribute statistics processing unit 130 (S140).

The morpheme part-of-speech tagging corpus error detecting method using rough sets may further include analyzing a corpus by transforming, by using the corpus analyzing unit 110, the corpus input as learning data in which part-of-speech tagging is performed into data for analysis, and thereafter by outputting the data for analysis to the attribute generating unit 120 (S100).

The analyzing the corpus (S100) may further include forming, by the corpus analyzing unit 110, a morpheme and a morpheme input value by manual work, among word phrases included in the input corpus, in a single word phrase line sequentially and output them.

Advantageous Effects

According to the above-described configurations, the present invention is effective in that with respect to a corpus produced manually by a number of operators for natural language processing, attributes for word phrases are automatically generated by using a rough set theory, and thereafter, by making attributes of the higher frequency count for the same word phrase as correct attributes, any error can be detected and corrected.

DESCRIPTION OF DRAWINGS

FIG. 2 is a view showing an example of a kernel to which a rough set algorithm included in an attribute generating unit 120 is applied;

FIG. 5 is a view showing an example of a corpus subject to error detection;

FIG. 6 is a view showing an example of data subject to analysis, in which input corpus is transformed for error inspection and analysis; and FIG. 7 is a view showing an example of the analyzed corpus including attributes generated by the attribute generating unit 120.

MODE FOR INVENTION

Hereinbelow, in explaining exemplary embodiments of the present invention, if it is determined that detailed description of any relevant function and/or configuration known to the public is liable to make the gist of the present invention unnecessarily unclear, the detailed description thereof will be omitted.

Exemplary embodiments according to the concept of the present invention may be modified in various manners or may have a variety of forms, and thus, specific exemplary embodiments are illustrated in the accompanying drawings, and they will be described in detail in the specification for the present invention. However, this is not intended to limit the exemplary embodiments according to the concept of the present invention to specific disclosure forms, and it should be understood that the present invention covers any and all modifications, equivalents or replacements that can be covered in the concept and technical scope of the present invention.

When it is described that a component is "connected" or "accessed" to another component, it should be understood that the component may be directly connected or accessed to the other component, and also that there may be a further component in between the two components. Meanwhile, when it is described that a component is "directly connected" or "directly accessed" to another component, it should be understood that no component is present in between the two components. Further, any other expressions describing relations between components, that is, "between ~" and "directly between ~", or "adjacent to ~" and "adjacent directly to ~", etc. should be interpreted in the same manner.

Those terms used in the specification for the present invention are merely to describe specific exemplary embodiments of the present invention, having no intention to limit the present invention to the described embodiments. Expression of a singular form may cover expression of a plural form unless it is obvious that the context requires otherwise. Also, as such terms as "comprise", "have", etc. in the specification are used merely to designate presence of features, figures, steps, operations, components, parts, or any combination thereof, it should be understood that presence of one or more other features, figures, steps, operations, components, parts, or any combination thereof or possibility to add any of them are not excluded in advance.

Hereinbelow, the present invention will be in more details described in reference to the accompanying drawings illustrating exemplary embodiments of the present invention.

Figure 1:
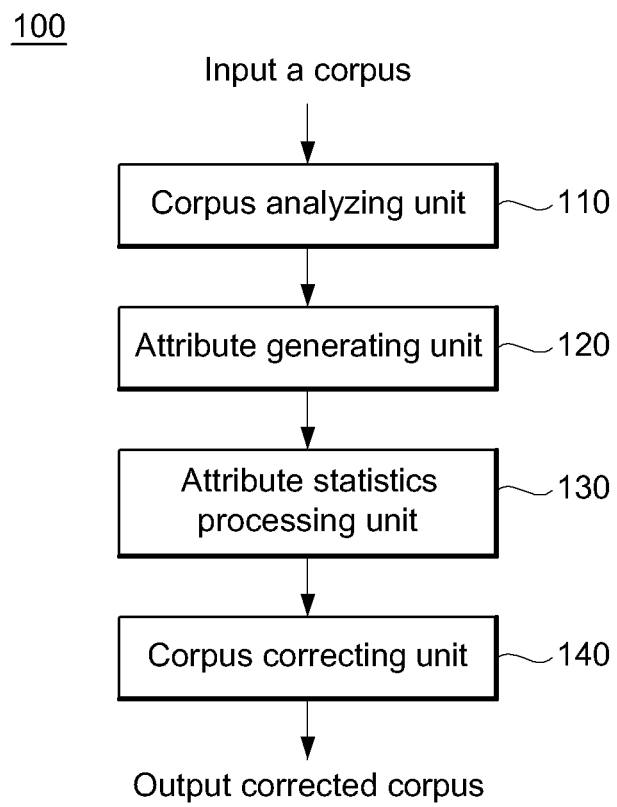
FIG. 1 is a block diagram showing a device 100 for detecting a morpheme part-of-speech tagging corpus error according to an embodiment of the present invention.

FIG. 1 is a block diagram showing a device 100 for detecting a morpheme part-of-speech tagging corpus error (hereinafter referred to as "the corpus error detecting device 100") according to an exemplary embodiment of the present invention.

As shown in FIG. 1, the corpus error detecting device 100 may be configured to include a corpus analyzing unit 110, an attribute generating unit 120, an attribute statistics processing unit 130, and a corpus correcting unit 140.

The corpus analyzing unit 110 may be configured to receive an input corpus as learning data in which part-of-speech tagging is performed, and transform the corpus into data for analysis. Also, the corpus analyzing unit 110 may be configured to make a morpheme and a morpheme input value by manual manipulation among the word phrases included in the input corpus sequentially formed and outputted in a single word phrase line.

The attribute generating unit 120 may be configured to have a kernel to which a rough set theory is applied, so as to generate attributes after analyzing the word phrases of the corpus, thereby generating attributes for the word phrases included in the corpus transformed and input in the attribute analyzing unit 110.

FIG. 2 is a view showing an example of a kernel to which a rough set algorithm included in an attribute generating unit 120 is applied.

As shown in FIG. 2, the kernel is configured to generate attributes in order of a morpheme of a previous word phrase of a word phrase subject to analysis, a part-of-speech of the previous word phrase, a morpheme of the current word phrase, a morpheme of a next word phrase, and a part-of-speech of the next word phrase, with respect to the word phrase subject to analysis in the input corpus, so as to generate attributes by each word phrase.

Referring to FIG. 1 again, the attribute statistics processing unit 130 may be configured to count attributes for the same word phrases among the word phrases and calculate attributes and frequency count for the same word phrases, to thereby generate part-of-speech tagging corpus error data.

The corpus correcting unit 140 is configured to correct attributes generated with the highest frequency count for the same word phrases, by using statistical data of attributes by each word phrase generated in the attribute statistics processing unit 130. In this case, as the morpheme part-of-speech tagging of the corpus is manually performed, an attribute having the highest frequency count is evaluated as a correct attribute. Accordingly, as the frequency count of the attribute is lowered, the probability of an error increases.

The corpus error detecting device 100 as described above may be manufactured as a hardware device that receives an input corpus produced manually by a number of operators, detects and corrects any corpus error, and outputs the corpus, or manufactured as a recording medium readable and executed by a computer, in which cords are recorded.

Figure 3:
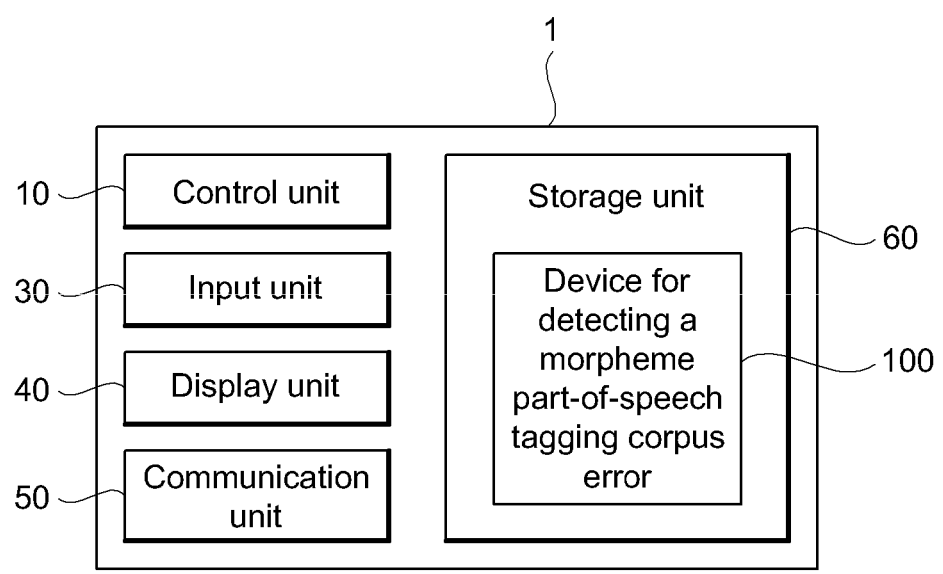
FIG. 3 is a functional block diagram showing a part-of-speech tagging corpus error detecting server 1, in which the device 100 for detecting a morpheme part-of-speech tagging corpus error is embodied in software and then installed at a computer.

FIG. 3 is a functional block diagram showing a part-of-speech tagging corpus error detecting server 1, in which the device 100 for detecting a morpheme part-of-speech tagging corpus error is embodied in software and then installed on a computer.

As shown in FIG. 3, the part-of-speech tagging corpus error detecting server 1 may be configured to include a control unit 10 as a central processing unit, a storage unit 60 at which an operation program executed by the control unit 10 and the corpus error detecting device 100 of the present invention embodied in software are installed, an input unit 30 configured to be available for data input or input of a user control command, a display unit 40 displaying an internal operation process, and a communication unit 50 being capable of performing communication with the outside if the communication with the outside is required.

Different from this, the corpus error detecting device 100 may be embodied as a hardware device to which FPGA, etc. is applied and constructed as a part of the control unit 10.

Figure 4:
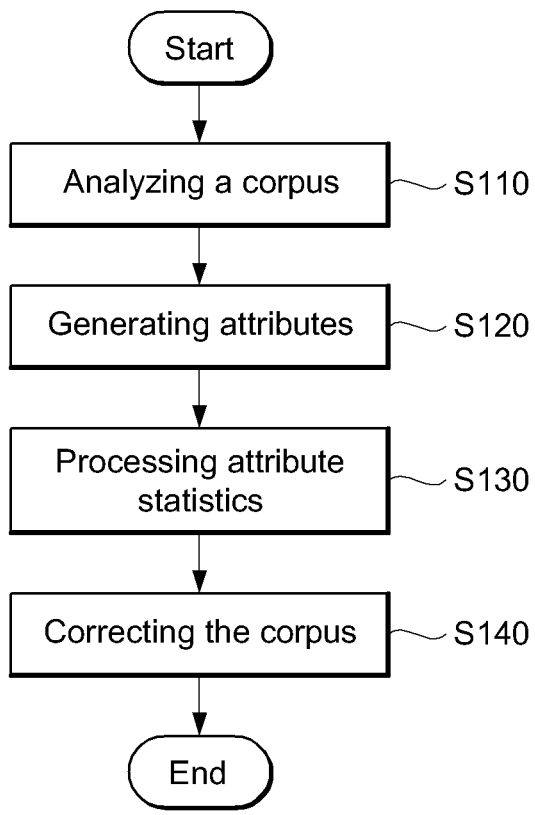
FIG. 4 is a flowchart showing processes of a method for detecting a morpheme part-of-speech tagging corpus error according to an example of the present invention.

FIG. 4 is a flowchart showing processes of a method for detecting a morpheme part-of-speech tagging corpus error (hereinafter referred to as "the corpus error detecting method") according to an embodiment of the present invention.

As shown in FIG. 4, the corpus error detecting method includes a corpus analyzing step S100, an attribute generating step S120, an attribute statistics processing step S130 and a corpus correcting step S140, in the method for detecting a morpheme part-of-speech tagging corpus error by a morpheme part-of-speech tagging corpus error detecting device including a corpus analyzing unit 110, an attribute generating unit 120, an attribute statistics processing unit 130, and a corpus correcting unit 140.

The corpus analyzing step S110 performs a process of receiving an input of a corpus as learning data in which part-of-speech tagging is performed and transforming the input corpus into data for analysis.

FIG. 5 is a view showing an example of a corpus subject to error detection.

As shown in FIG. 5, the input corpus includes an attribute composed of a morpheme/(a part-of-speech tagging code) performed by a number of operators with respect to a word phrase 'it is', which becomes 'it/NP+is/JX'. In the above-described corpus, a process to detect and correct any error included the attribute of 'it/NP+is/JX' is performed according to the present invention.

To facilitate detection or correction of this corpus error, in the corpus analyzing step S110, the corpus analyzing unit 110 can perform a analyzed data transforming step in which the corpus is transmitted into a line of word phrases having 'a morpheme' and 'a morpheme/a part-of-speech tagging code' with respect to the attribute.

FIG. 6 is a view showing an example of data subject to analysis, in which the input corpus is transformed for error inspection and analysis.

As shown in FIG. 6, it can be known that the corpora input by the analyzed data transforming process of the corpus analyzing step S110, are transformed to have a word phrase line having 'it(morpheme) it(morpheme)/JX(part-of-speech tagging code)' and word phrase lines having 'is(morpheme) is(morpheme)/JX(part-of-speech tagging code)'.

Referring to FIG. 4 again, in the attribute generating step S120, the attribute generating unit 120 generates respective attributes for the word phrases of the corpus transformed to an object target to be analyzed, using an inside kernel to which the rough set theory is applied, with respect to the word phrase included in the corpus transmitted and input in the corpus analyzing unit 110.

That is, with respect to a word phrase of the transformed corpus, the attribute generating unit 120 extracts a morpheme of a previous word phrase, a part-of-speech of the previous word phrase, a morpheme of the current word phrase, a morpheme of a next word phrase, and a part-of-speech of the next word phrase sequentially and then generates attributes.

FIG. 7 is a view showing an example of the analyzed corpus including attributes generated by the attribute generating unit 120.

The present invention will be further explained by use of FIG. 7 as an example. With respect to a word phrase of 'it it/NP', as neither morpheme nor part-of-speech of a previous word phrase is present, the word phrase is indicated as 'X X'. As a morpheme of the current word phrase is itself, 'it' is indicated. A morpheme of its next word phrase is indicated as 'is' of a next word phrase, and as a part-of-speech of the next word phrase then, 'JX' which is a part-of-speech of 'is' is extracted and indicated as a part-of-speech of the next word phrase, thereby forming an attribute of 'X X it is JX' with respect to 'it it is/NP'.

With respect to the second word phrase 'is is/JX'', the same steps are repeatedly performed, thereby forming an attribute of 'it NP is apple NNG'.

The above-described steps for processing are performed with respect to all the word phrases of the corpus transformed for analysis.

Referring to FIG. 4 again, in the attribute statistics processing step S130, the attribute statistics processing unit 130 counts attributes for the same word phrase with respect to the word phrase generated as in FIG. 7 and calculates the frequency count of different attributes for the same word phrases, to thereby generate part-of-speech tagging corpus error data. As an example, the attribute statistics processing step S130 classifies different attributes with respect to word phrases such as 'it', 'is', 'is apple', etc., then counts each of them, and thereafter calculate the frequency counts of different attributes for each of them.

At the corpus correcting step S140, the corpus correcting unit 140 determines attributes generated with the highest frequency count for the same word phrases as correct attributes, using the statistical data of the attributes by each word phrase generated in the attribute statistics processing unit 130, and corrects any other attributes to the concerned attributes.

Through the processes as described above, any error in the corpus generated by manual manipulation can be automatically detected and corrected.

Exemplary Embodiments

To verify efficiency of the present invention, a number of researchers carried out tests targeted for the corpuses prepared manually, as collections of words to which parts of speech are tagged. Those corpuses generated by a number of persons create a problem in consistency for various reasons. Such a problem may be caused because of insufficient instructions, or different skills. The following description will be focused on errors in consistency (contradictionary) in the language information tagged corpus. In the language information tagged corpus, there are relatively more errors in consistency than any error in classification, and it is difficult to detect any error in classification because the error and a correct answer cannot be compared in the corpus.

First, error rates of collection of words, the corpus generated as experimental data, to the correct answers corrected manually are indicated below in Table 1.

TABLE 1

| Error number and errors measured in an early corpus | | | |
|---|---|---|---|
| Corpus | Number of correct word phrases | Number of erroneous word phrases | Error rate (%) |
| 1 | 13,093 | 260 | 1.99 |
| 2 | 80,323 | 2,681 | 3.34 |
| 3 | 6,003 | 156 | 2.60 |

In the above embodiment of the present invention, with respect to the corpora numbered 1, 2, and 3 having 13,093, 80,323, and 6,003 word phrases respectively, data to calculate the error rates for the correct corpora whose errors were detected manually was used.

Using the above-described input corpuses, the result processing by the attribute statistics processing unit 130 the generated attributes after the attribute generating unit 120 generates the attributes by using the kernel is indicated below in Table 2.

TABLE 2

| Table showing corpus error detection result by the corpus error detecting device 100 for the corpora subject to test | | | |
|---|---|---|---|
| Corpus | Error rate (%) | Number of expected erroneous word phrases | Expected error rate (%) |
| 1 | 1.19 | 271 | 2.07 |
| 2 | 3.34 | 2,419 | 3.01 |
| 3 | 2.60 | 74 | 1.23 |

As indicated above in Table 2, when the expected values of the errors in the early corpora as a result of the corpus error detection are compared with errors in the actual corpora after applying the present invention, the corpus numbered (Number 1 corpus) generated a difference of 0.88%, the corpus numbered 2 (Number 2 corpus) 0.33%, and the corpus numbered 3 (Number 3 corpus) 1.37%. In this regard, it can be known that only little difference from the error rate using the correct corpora occurred.

The technical concept of the present invention as described above has been specifically described with respect to preferable exemplary embodiments. In this regard, as it should be noted that as the exemplary embodiments of the present invention are for illustrative purposes, the present invention should not be limited thereto. Also, those skilled in the art of the present invention will appreciate that various modifications, additions and substitutions are possible, without departing from the scope and spirit of the invention as disclosed in the accompanying claims.

INDUSTRIAL APPLICABILITY

The present invention is industrially applicable to those fields of language processing using computers.

The invention claimed is:

1. A device for detecting a morpheme tagging corpus error, the device comprising:
   an attribute generating unit configured to generate attributes for word phrases included in an input corpus, by using a kernel to which a rough set theory is applied; and
   an attribute statistics processing unit configured to generate part-of-speech tagging corpus error data through a calculation of attributes and frequency count for same word phrases by counting attributes for the same word phrases among the word phrases.

2. The device of claim 1, wherein for a current word phrase to be analyzed in the input corpus, the kernel is configured to generate attributes in order of a morpheme of a previous word phrase of the current word phrase to be analyzed, a part-of-speech of the previous word phrase, a morpheme of the current word phrase, a morpheme of a next word phrase of the current word phrase, and a part-of-speech of the next word phrase.

3. The device of claim 1, further comprising:
   a corpus correcting unit configured to correct an attribute generated with the highest frequency count for the same word phrases, using statistical data of the attributes by each word phrase generated in the attribute statistics processing unit.

4. The device of claim 1, further comprising:
   a corpus analyzing unit configured to transform the corpus input as learning data in which part-of-speech tagging is performed into data for analysis.

5. The device of claim 4, wherein the corpus analyzing unit is configured to form a morpheme among word phrases included in the input corpus and a morpheme input value by manual work in a single word phrase line sequentially and output them.

6. A method for detecting a morpheme part-of-speech tagging corpus error performed by a device configured to detect the morpheme part-of-speech tagging corpus error, the device comprising a corpus analyzing unit, an attribute generating unit, an attribute statistics processing unit and a corpus correcting unit, the method comprising:
   generating, by the attribute generating unit, attributes for word phrases included in an input corpus, by using a kernel to which a rough set theory is applied; and
   generating, by the attribute statistics processing unit, part-of-speech tagging corpus error data through a calculation of attributes and frequency count for same word phrases by counting attributes for the same word phrases among the word phrases.

7. The method of claim 6, wherein for a current word phrase to be analyzed in the input corpus, the kernel is configured to generate attributes in order of a morpheme of a previous word phrase of the current word phrase to be analyzed, a part-of-speech of the previous word phrase, a morpheme of the current word phrase, a morpheme of a next word phrase of the current word phrase, and a part-of-speech of the next word phrase.

8. The method of claim 6, further comprising:
   correcting, by the corpus correcting unit, an attribute generated with the highest frequency count for the same word phrases, using statistical data of the attributes by each word phrase generated in the attribute statistics processing unit.

9. The method of claim 6, further comprising:
   analyzing the corpus, using the corpus analyzing unit, by transforming the corpus input as learning data in which part-of-speech tagging is performed into data for analysis, and thereafter by outputting the data for analysis to the attribute generating unit.

10. The method of claim 9, wherein the analyzing a corpus further comprises:
    forming, by the corpus analyzing unit, a morpheme and a morpheme input value by manual work, among word phrases included in the input corpus sequentially formed and outputted in a single word phrase line sequentially.

* * * * *